Patented Sept. 20, 1932

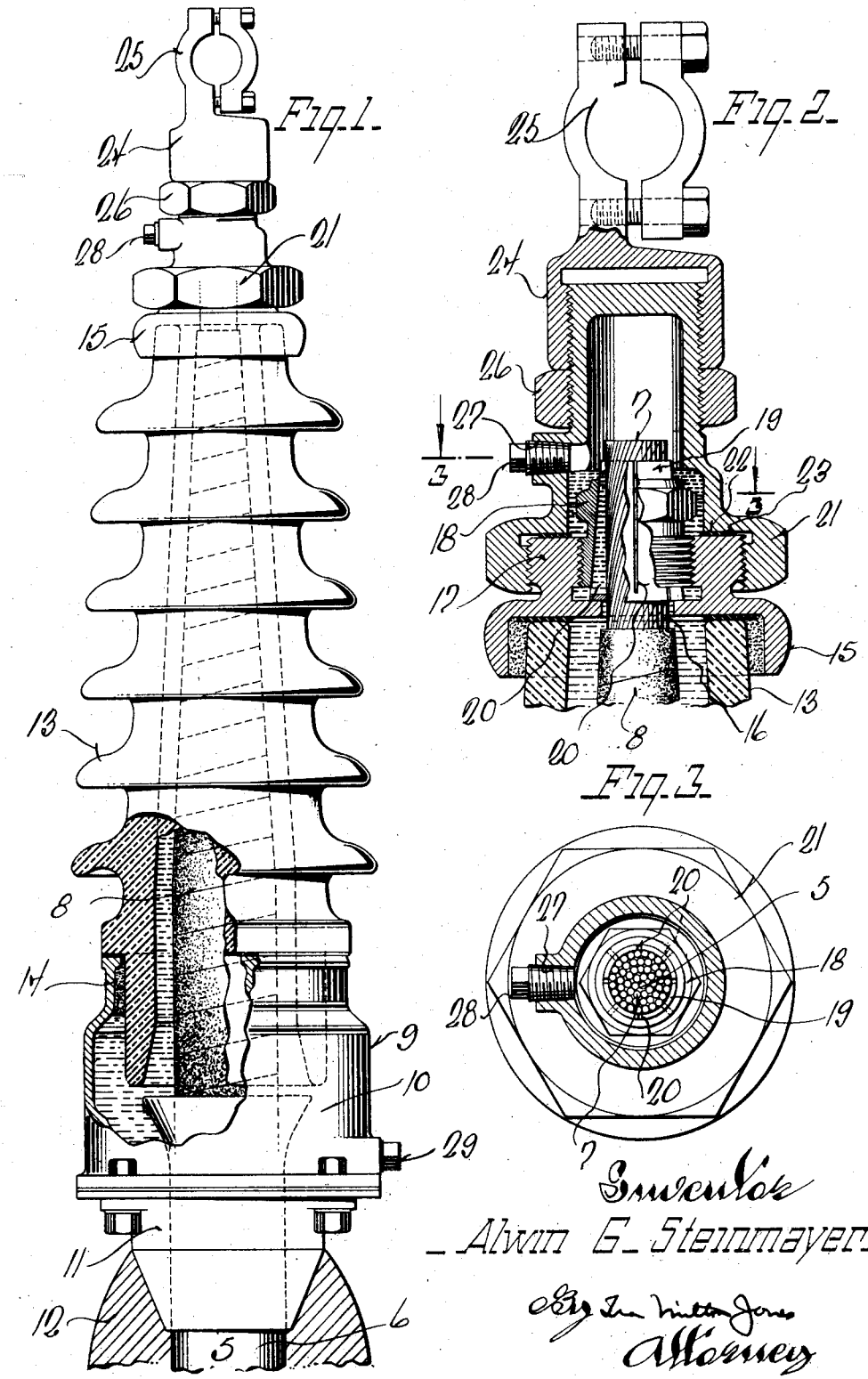

1,878,016

UNITED STATES PATENT OFFICE

ALWIN G. STEINMAYER, OF MILWAUKEE, WISCONSIN, ASSIGNOR TO LINE MATERIAL COMPANY, OF SOUTH MILWAUKEE, WISCONSIN, A CORPORATION OF WISCONSIN

POTHEAD

Application filed November 22, 1929. Serial No. 409,032.

This invention relates to certain new and useful improvements in pot heads and refers more particularly to means for sealing them and for connecting terminal members with the cable.

As is well known, pot heads are made to accommodate single and multiple conductor cables, and in each instance the cable enters a metal casing from which tubular insulator bushings extend, to receive the separated conductors whose outer ends are suitably connected with external terminal members usually carried by the bushings. The interior of the casing and the bushings is filled with a suitable dielectric compound to positively preclude the entrance of moisture to the interior of the cable, and heretofore the compound has usually been of a solid nature poured into the pot head while in a molten state.

Under most conditions this form of dielectric has been satisfactory, but in some instances it has been desirable to employ a liquid for this purpose. The construction of pot heads heretofore in use, however, was not adapted to the use of a liquid dielectric and, therefore, it is one of the objects of this invention to provide a pot head which is well adapted to the use of a liquid dielectric such as oil or the like.

Another object of this invention resides in the provision of novel means for sealing the open end of the insulator bushing of a pot head so that leakage of a liquid dielectric is positively prevented.

And a further object of this invention resides in the provision of means whereby various types of bus bars or aerial conductors may be connected with the cable ends.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is an elevational view of a pot head for a single conductor cable embodying my invention, and having portions broken away and in section to illustrate structural details;

Figure 2 is an enlarged transverse sectional view of the upper end thereof; and

Figure 3 is a cross sectional view taken through Figure 2 on the plane of the line 3—3.

Referring now more particularly to the accompanying drawing, the numeral 5 represents a single conductor cable of conventional construction including a lead sheath, a conductor 7 and insulation 8. The cable 5 extends upwardly through the lower end of the pot head, indicated generally by the numeral 9, and comprising a base 10 having a lower flange 11 secured thereto which snugly receives the lead sheath of the cable and is secured thereto by a wiped lead joint or by any other conventional method.

The casing 10 has an elongated tubular insulator bushing 13 cemented in its upper open end, as at 14, through which the end of the conductor from which the lead sheath has been stripped, extends, the bore of the insulator bushing being tapered and the insulation of the cable being taperingly stripped from the conductor, as is customary, to bare the uppermost end of the conductor.

The upper end of the insulator bushing 13 has a cap member 15 cemented thereto which is provided with an axial opening 16 through which the bared end of the conductor 7 is loosely passed. An annular flange or projection 17 is extended upwardly from the cap member, the projection being both internally and exteriorly threaded.

The internal thread of the projection 17 is adapted to receive a tubular clamping nut 18 whose bore is tapered to correspond to the taper of a wedge bushing 19 preferably formed of lead or other suitable soft metal.

The base of the wedge bushing rests on the upper surface of the cap adjacent the periphery of the opening 16 so that threading of the clamping nut into the annular projection 17 securely clamps or wedges the bushing 19 between the nut and the outer surface of the conductor to form a perfect electrical connection between the conductor and the cap member and to securely hold the conductor.

To facilitate the compression of the wedge member 19, a plurality of slots 20 are formed therein and alternately extend downwardly from its upper end and upwardly from its base. In this manner, it is readily apparent that communication is maintained between the interior of the insulating bushing beneath the cap and the space above the bushing, which communication is through the opening 16 and then through the slots 20.

The outer thread of the annular projection 17 receives a bonnet or hood 21 which has an internal shoulder 22 disposed in alignment with the top surface of the annular projection to clamp between it and the said top surface a packing washer or gasket 23 and as the bonnet is closed at its top, it is readily apparent that its securement to the cap 15 tightly seals the pot head.

The upper end of the bonnet is reduced in diameter and is exteriorly threaded to provide means for securing any desired terminal fitting 24 thereto. In the present instance, the terminal member 24 is adapted to receive a round bus bar or conductor, which is clamped thereto by clamping means 25. The lower portion of the terminal member 24 is interiorly threaded to be secured on the upper end of the bonnet where it is held against displacement by a jam nut 26.

To permit the interior of the insulator bushing and of the pot head base 10 to be filled with a suitable dielectric, which is preferably a liquid such as oil, the bonnet is provided with an opening 27. A plug 28 normally closes the opening, which being adjacent the uppermost end of the conductor and above the clamping nut 18 permits the entire insulator bushing to be filled with fluid, the oil flowing by gravity through the plurality of slots 20 in the bushing.

Another method of filling and maintaining the pot head filled is by connecting an opening in the lower portion of the base 10 and which is normally closed by a plug 29, with a storage tank, not shown, by means of a pipe line also not shown. The tank is usually partially filled with oil under pressure or it may be located sufficiently high to cause the oil to flow into the pot head by gravity. In either instance, the upper opening 27 provides an air vent during the initial filling.

From the foregoing description, taken in connection with the accompanying drawing, it will be readily apparent to those skilled in the art to which an invention of the character described appertains, that I provide a pot head having novel means for connecting a terminal member with a cable conductor, and wherein the use of a liquid dielectric is facilitated and the conductor is readily detachably connected with the terminal member in a manner which permits such liquid dielectric to substantially surround the connection.

What I claim as my invention is:

1. In a device of the character described, a tubular insulator, a member mounted at one end of the tubular insulator and having an opening therein, an electric conductor within the insulator and loosely projected through the opening in said member, clamping means connecting the conductor with said member, said means having passageways communicating the interior of the tubular insulator with the exterior thereof, and hood means connected with the member to enclose the end of the conductor and the clamping means.

2. In a device of the character described, a tubular insulator, a member connected with the end of the tubular insulator and having an opening therein, an electric conductor within the insulator and loosely projected through the opening in said member, clamping means connecting the conductor with said member, said means having passageways communicating the interior of the tubular insulator with the exterior thereof, hood-like terminal means secured over said member, and means providing a fluid-tight seal at the open end of the hood-like terminal means.

3. In a device of the character described, a tubular insulator, a member mounted on the outer end of the insulator, said member having an opening, a conductor within the insulator having an end portion projected loosely through the opening in the member, an annular projection carried by the member and being externally and internally threaded, means for readily detachably connecting the conductor with the member including a clamping nut received in the internal thread of said annular projection, said means having passageways communicating the interior of the insulator with the exterior of the member, terminal means enclosing the end of the conductor and the means connecting it with the member, said terminal means being threaded on the exterior thread of the annular projection, and means forming a fluid-tight seal at the threaded end of the terminal means.

4. In a device of the character described, a tubular insulator, a member mounted at the open end of the insulator, said member having an opening, a conductor within the insulator having one end portion loosely projected through the member opening, means readily detachably connecting the conductor with the member and including a clamping nut having a threaded connection with said member, and terminal means also having a threaded connection with said member.

5. In a device of the character described, a tubular insulator, a member mounted at the open end of the insulator, said member having an opening, a conductor within the insulator having one end portion loosely extended through the member opening, a wedge member surrounding the conductor and resting on the member, a clamping nut having a threaded connection with the member for clamping the wedge member between it and the conductor to provide a good electrical connection between the conductor and the member, and terminal means also having a threaded connection with the member 6. In a device of the character described, a tubular insulator bushing, a member mounted at the open end of the insulator bushing and having an opening therein, a conductor within the insulator bushing and having a portion thereof projected loosely through the member opening, means readily detachably connecting the conductor with the member including a wedge member surrounding the conductor and resting upon the member, a clamping nut having a threaded engagement with the member for clamping the wedge member between it and the conductor, said wedge member having slots through which the interior of the insulator bushing is communicated with the exterior of the member, terminal means enclosing the conductor and the means connecting it with the member and also having a threaded connection with the member, and said terminal means sealing the interior of the bushing from the atmosphere.

7. In a device of the character described, a tubular insulator, a member mounted at the open end of the insulator and having an opening therein, a conductor within the tubular insulator and having a portion projected loosely through the member opening, means readily detachably connecting the conductor with the member including a clamping nut having a threaded engagement with the member, a bonnet enclosing the conductor and the means connecting it with the member also threaded on the member, and terminal means readily detachably connected with the bonnet.

8. In a device of the character described, a tubular insulator bushing, a member mounted at the open end of the bushing and having an opening therein, a conductor within the insulator bushing and having a portion loosely extended through the member opening whereby communication is maintained from the interior of the bushing to the exterior of the member, means readily detachably connecting the conductor with the member to form a good electrical connection therebetween without closing off communication between the interior of the bushing and the exterior of the member, a bonnet enclosing the conductor and the means connecting it with the member, means readily detachably connecting the bonnet with the member, means providing a fluid-tight seal at the connected end of the bonnet, said bonnet having a normally closed port through which a dielectric may be inserted to fill the interior of the insulator bushing to above the top of the member, and means for readily detachably connecting a terminal member with the bonnet.

9. In a device of the character described, a tubular insulator, a member connected with one end of the tubular insulator and having an opening therein, an electrical conductor within the insulator and having one end portion loosely projected through the opening, a tapered sleeve engaged over said projecting end portion of the conductor, a clamping nut engageable with the member impinging the tapered sleeve between it and the conductor whereby the conductor is readily detachably connected with the member and has a good electrical connection therewith, said clamping nut being open ended to enable the tapered sleeve and the conductor end to be visible during and after its application, and hood means connected with the member to enclose the end of the conductor, the tapered sleeve, and the clamping nut.

In testimony whereof I have hereunto affixed my signature.

ALWIN G. STEINMAYER.